(12) United States Patent
Kannan et al.

(10) Patent No.: US 11,483,154 B2
(45) Date of Patent: Oct. 25, 2022

(54) ARTIFICIAL INTELLIGENCE CERTIFICATION OF FACTSHEETS USING BLOCKCHAIN

(71) Applicant: International Business Machines Corporation, Armonk, NY (US)

(72) Inventors: Kalapriya Kannan, Bangalore (IN); Pranay Kumar Lohia, Bhagalpur (IN); Samuel Hoffman, New York, NY (US); Kush Raj Varshney, Ossining, NY (US); Sameep Mehta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 16/795,455

(22) Filed: Feb. 19, 2020

(65) Prior Publication Data
US 2021/0258160 A1    Aug. 19, 2021

(51) Int. Cl.
*H04L 9/32*    (2006.01)
*H04L 9/06*    (2006.01)
*H04L 9/00*    (2022.01)
*G06N 3/08*    (2006.01)

(52) U.S. Cl.
CPC .............. *H04L 9/32* (2013.01); *G06N 3/08* (2013.01); *H04L 9/0643* (2013.01); *H04L 9/50* (2022.05)

(58) Field of Classification Search
CPC ..... H04L 9/32; H04L 9/0643; H04L 2209/38; H04L 63/123; H04L 9/3239; G06N 3/08; G06N 20/00
See application file for complete search history.

(56) References Cited

U.S. PATENT DOCUMENTS

| 10,423,726 | B2 | 9/2019 | Bacarella | |
| 10,506,104 | B1 * | 12/2019 | Shakeri | H04L 9/3247 |
| 2019/0036712 | A1 * | 1/2019 | Qiu | H04L 9/006 |
| 2019/0228006 | A1 | 7/2019 | Tormasov | |

(Continued)

FOREIGN PATENT DOCUMENTS

| CN | 109102342 A | 12/2018 |
| CN | 109615015 A * | 4/2019 |

(Continued)

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

(Continued)

*Primary Examiner* — Mohammed Waliullah
(74) *Attorney, Agent, or Firm* — Sherman IP LLP; Kenneth L. Sherman; Steven Laut

(57) ABSTRACT

A method for blockchain certification of artificial intelligence factsheets that includes receiving by a computing device, an artificial intelligence model. The computing device generates an artificial intelligence factsheet based upon logic of the artificial intelligence model. The computing device generates a blockchain link for a blockchain. The blockchain link certifies the artificial intelligence factsheet. The computing device transmits the blockchain link certifying the artificial intelligence factsheet to other computing devices.

17 Claims, 12 Drawing Sheets

(56) References Cited

U.S. PATENT DOCUMENTS

2019/0251553 A1* 8/2019 Ma .................. H04L 9/3239
2019/0258783 A1   8/2019 Mehta
2019/0332955 A1   10/2019 Manamohan
2019/0358428 A1* 11/2019 Wang ................ B25J 11/008

FOREIGN PATENT DOCUMENTS

CN   109615015 A   4/2019
CN   110011990 A   7/2019

OTHER PUBLICATIONS

Dinh, TTA, et al. "Untangling blockchain: A data processing view of blockchain systems." IEEE Transactions on Knowledge and Data Engineering, Jul. 2018, pp. 1366-1385, vol. 30, No. 7, IEEE, United States.

Makridakis, S. et al. "Blockchain: The next breakthrough in the rapid progress of AI." Artificial Intelligence-Emerging Trends and Applications, Jun. 2018, pp. 197-220, IntechOpen, United Kingdom.

* cited by examiner

710

Listing 1: AI Resource

```
asset AIResource
identified by
identifier{
 o String identifier
 --> User owner
 o String type
 o String tCreation
 --> metadata mdata[]
 o String hashValue
 o String hashMethod
 o String storeReference
}
```

616

Listing 2: AI Validator

```
asset AIValidator
identified by
aIdentifier {
o String aIdentifier
-->AIResource[]
     inputResource
-->AIProgram function
-->AIResource[]
     ouputResource
-->AIProgram[]
     metricEvaluator
}
\label{lbl:aivalidator}
```

ARTIFICIAL INTELLIGENCE CERTIFICATION OF FACTSHEETS USING BLOCKCHAIN

BACKGROUND

The field of embodiments of the present invention relate to artificial intelligence (AI) certification of factsheets using blockchain.

Valuation of artificial intelligence (AI) models in AI marketplaces today is largely determined by uncertified factsheets by suppliers. One problem with uncertified factsheets, however, is leaving customers to deal with the risk of later finding data or AI models to be invalid or underperforming. Additionally, the information asymmetry may lead to a so-called market for 'lemons' and could eventually lead to market collapse.

SUMMARY

Embodiments relate to artificial intelligence (AI) certification of factsheets using blockchain. One embodiment provides a method for blockchain certification of AI factsheets that includes receiving by a computing device, an AI model. The computing device generates an AI factsheet based upon logic of the artificial intelligence model. The computing device generates a blockchain link for a blockchain. The blockchain link certifies the AI factsheet. The computing device transmits the blockchain link certifying the AI factsheet to other computing devices. These features contribute to the advantage of certification of AI factsheets so that a risk of finding data or AI models to be invalid or underperforming later on is mitigated. The features further contribute to the advantage obviating the necessity for a centralized entity that provide AI factsheet certification.

One or more of the following features may be included. In some embodiments, the blockchain link provides an attestation certificate that certifies AI resources.

In some embodiments, the AI resources are selected from the group consisting of an AI training resource, an AI testing resource, and datasets with an associated factsheet and an AI validator In some embodiments, the AI validator verifies metrics of the AI model.

In some embodiments, the certificate of attestation is applied for within a centralized marketplace for AI resources or a plurality of distributed marketplaces for AI resources.

In some embodiments, the blockchain is employed as a moderator and certifying authority for AI resource requests for the centralized marketplace.

In some embodiments, the blockchain is employed for an AI repository for AI factsheets in each marketplace for the plurality of distributed marketplaces.

These and other features, aspects and advantages of the present embodiments will become understood with reference to the following description, appended claims and accompanying figures.

BRIEF DESCRIPTION OF THE DRAWINGS

FIG. 7A is an example listing for an AI resource factsheet, according to one embodiment;

FIG. 7B is an example listing for an AIValidator, according to one embodiment;

DETAILED DESCRIPTION

Figure 1:
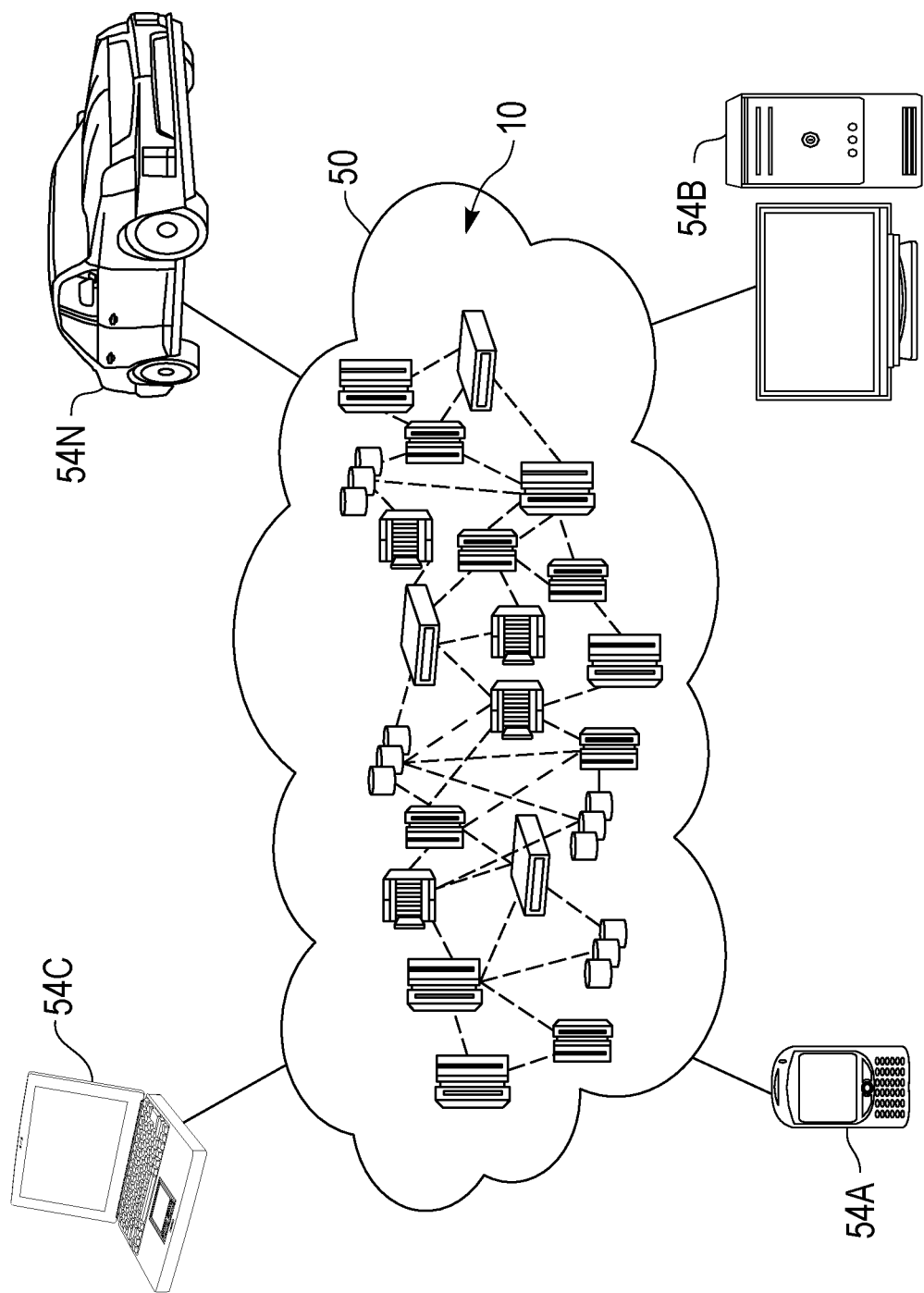
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments relate to blockchain certification of artificial intelligence (AI) factsheets. One embodiment provides a method for blockchain certification of AI factsheets that includes receiving by a computing device, an AI model. The computing device generates an AI factsheet based upon logic of the artificial intelligence model. The computing device generates a blockchain link for a blockchain. The blockchain link certifies the AI factsheet. The computing device transmits the blockchain link certifying the AI factsheet to other computing devices. Other embodiments include a computer program product for blockchain certification of artificial intelligence factsheets, and an apparatus including a memory for storing instructions and a processor configured to execute the instructions. The method may further include that the blockchain link provides an attestation certificate that certifies AI resources. The method may additionally include that the AI resources are selected from the group consisting of an AI training resource, an AI testing resource, and datasets with an associated factsheet and an AI validator. The method may further include that the AI validator verifies metrics of the AI model. The method may still further include that the certificate of attestation is applied for within a centralized marketplace for AI resources or a plurality of distributed marketplaces for AI resources.

The method may yet further include that the blockchain is employed as a moderator and certifying authority for AI resource requests for the centralized marketplace. The method may further include that the blockchain is employed for an AI repository for AI factsheets in each marketplace for the plurality of distributed marketplaces.

A blockchain includes a growing list of records referred to as blocks, which are linked using cryptography. Each block in a blockchain may include a cryptographic hash of the previous block in the chain, a time stamp and transaction data (e.g., represented as a tree such as a Merkle tree, etc.). The information for each block is related to a transaction and each block is linked to a prior block in the chain. The blocks may be tables and transactions as the records. Each transaction references the transaction output of the previous transaction. Conventional blockchains are resistant to modification of the data, and may include a distributed ledger that can record transactions between two parties efficiently and in a verifiable and permanent way. When used as a distributed ledger, a blockchain is typically managed by a peer-to-peer network that follow a protocol for inter-node communication and validation of new blocks. Once recorded, the data in any block cannot be changed retroactively without alteration of all subsequent blocks, which may require consensus of the network majority. A blockchain may be considered as a distributed transaction database among multiple computing devices. The computing devices can each have copies of the blockchain as new blocks are generated. Therefore, for conventional blockchains no centralized or official copy of the blockchain exists and no computing device is trusted more than any other computing device.

AI resources herein refers to AI assets, such as an factsheets, AI model(s), data, preprocessing programs, validation programs, evaluation programs, and training and testing programs. AI models may include a trained machine learning model (e.g., models, such as a neural network (NN), a convolutional NN (CNN), a deep NN (DNN), a recurrent NN (RNN), a Long short-term memory (LSTM) based NN, gate recurrent unit (GRU) based RNN, tree-based CNN, self-attention network (e.g., an NN that utilizes the attention mechanism as the basic building block; self-attention networks have been shown to be effective for sequence modeling tasks, while having no recurrence or convolutions), BiLSTM (bi-directional LSTM), etc.).

An AI marketplace herein is interchangeably referred to as an AI platform, which is a platform where sellers can list their AI resources and buyers can find and purchase AI resources. An AI marketplace may optionally provide a run time environment for executing training and testing models.

An AI pipeline is referred to herein as a sequence of workflows in the AI development process. An AI pipeline also refers to the data and associated programs for producing an AI model.

An AI factsheet is herein referred to as a certificate containing all the AI resource details, quality metrics and other meta-information.

A supplier is herein referred to as an organization or individual that owns AI resources and desires to sell them.

A buyer is herein referred to as an organization or individual willing to buy AI resources from the marketplace.

It is understood in advance that although this disclosure includes a detailed description of cloud computing, implementation of the teachings recited herein are not limited to a cloud computing environment. Rather, embodiments of the present embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
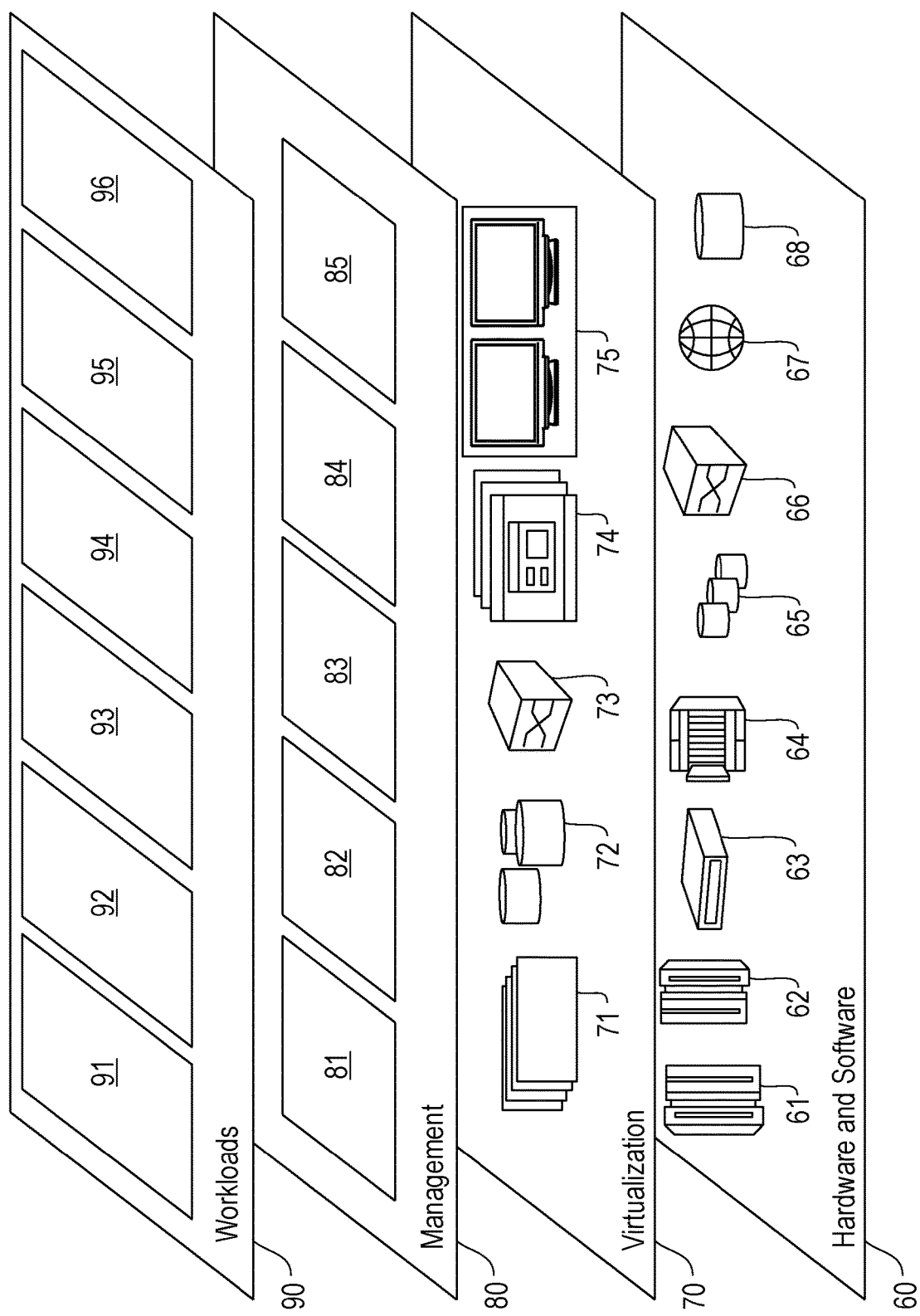
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and blockchain certification of AI factsheets processing 96 (see, e.g., system 500, FIG. 5, flow 600, FIG. 6, process 1200, FIG. 12). As mentioned above, all of the foregoing examples described with respect to FIG. 2 are illustrative only, and the embodiments are not limited to these examples.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 3:
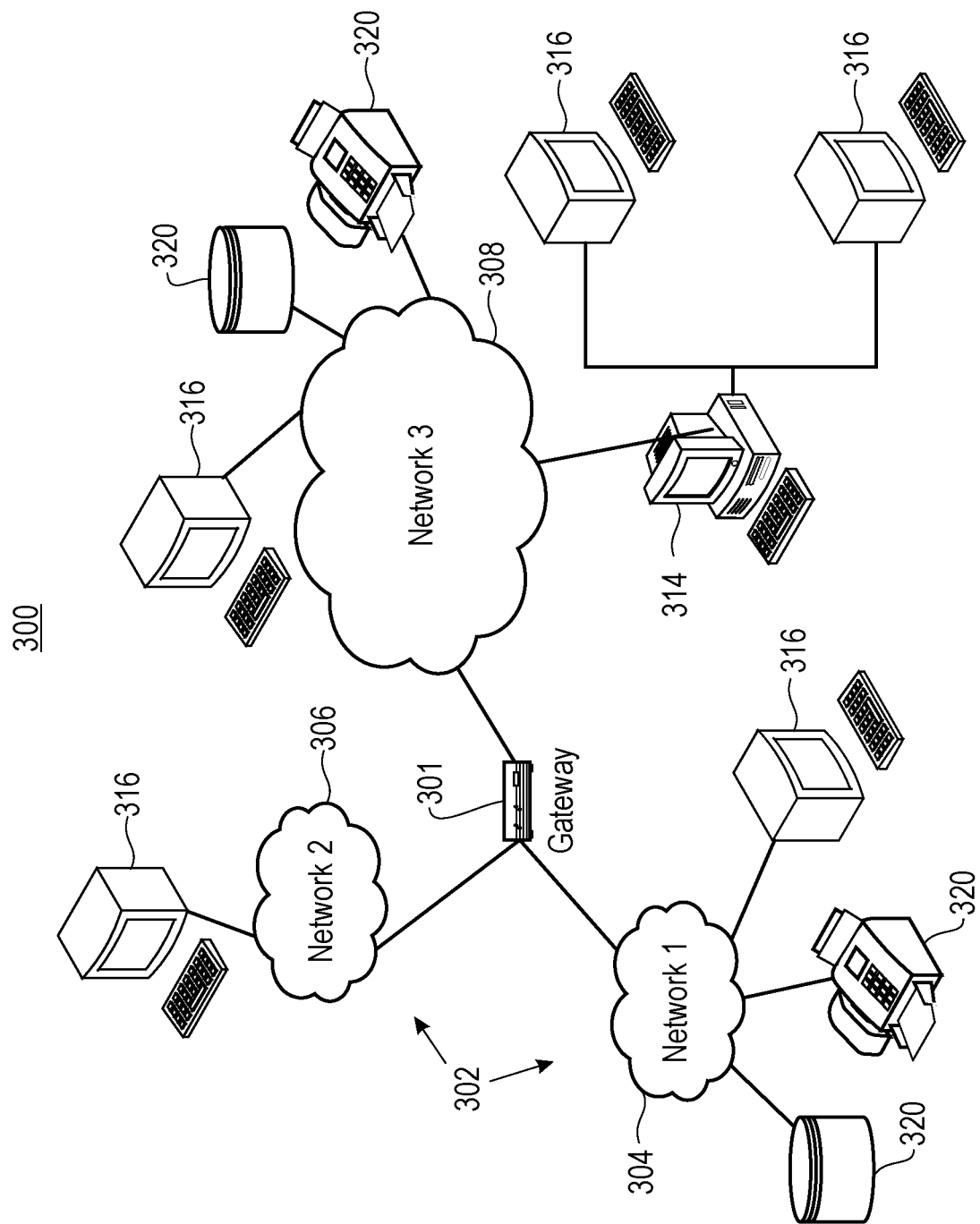
FIG. 3 is a network architecture of a system for artificial intelligence (AI) certification of factsheets using blockchain processing, according to an embodiment.

FIG. 3 is a network architecture of a system 300 for blockchain certification of AI factsheets processing, according to an embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX® system that emulates an IBM® z/OS environment, a UNIX® system that virtually hosts a MICROSOFT® WINDOWS® environment, a MICROSOFT® WINDOWS® system that emulates an IBM® z/OS environment, etc. This virtualization and/or emulation may be implemented through the use of VMWARE software in some embodiments.

Figure 4:
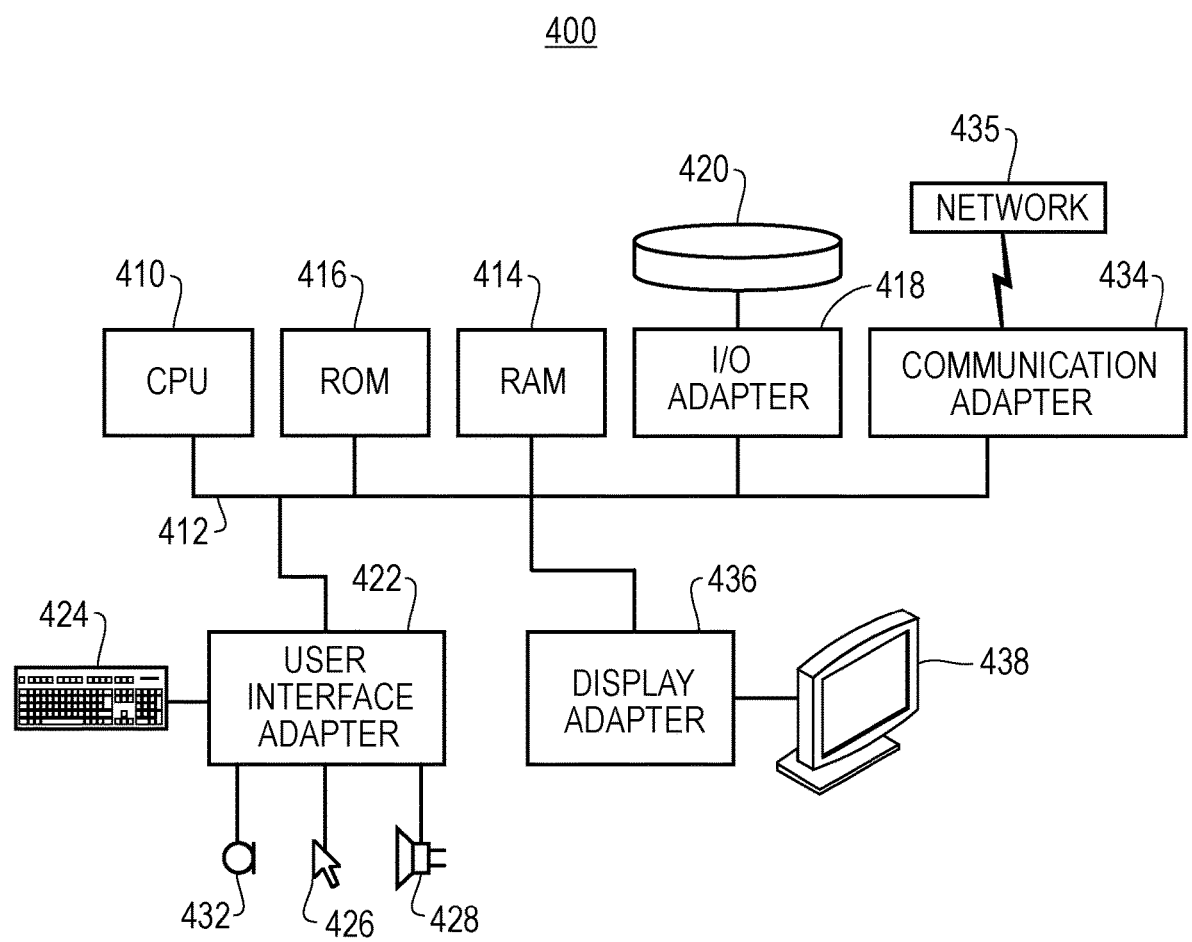
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT® WINDOWS® Operating System (OS), a MAC OS®, a UNIX® OS, etc. In one embodiment, the system 400 employs a POSIX® based file system. It will be appreciated that other examples may also be implemented on platforms and operating systems other than those mentioned. Such other examples may include operating systems written using JAVA®, XML, C, and/or C++ language, or other programming languages, along with an object oriented programming methodology. Object oriented programming (OOP), which has become increasingly used to develop complex applications, may also be used.

Figure 5:
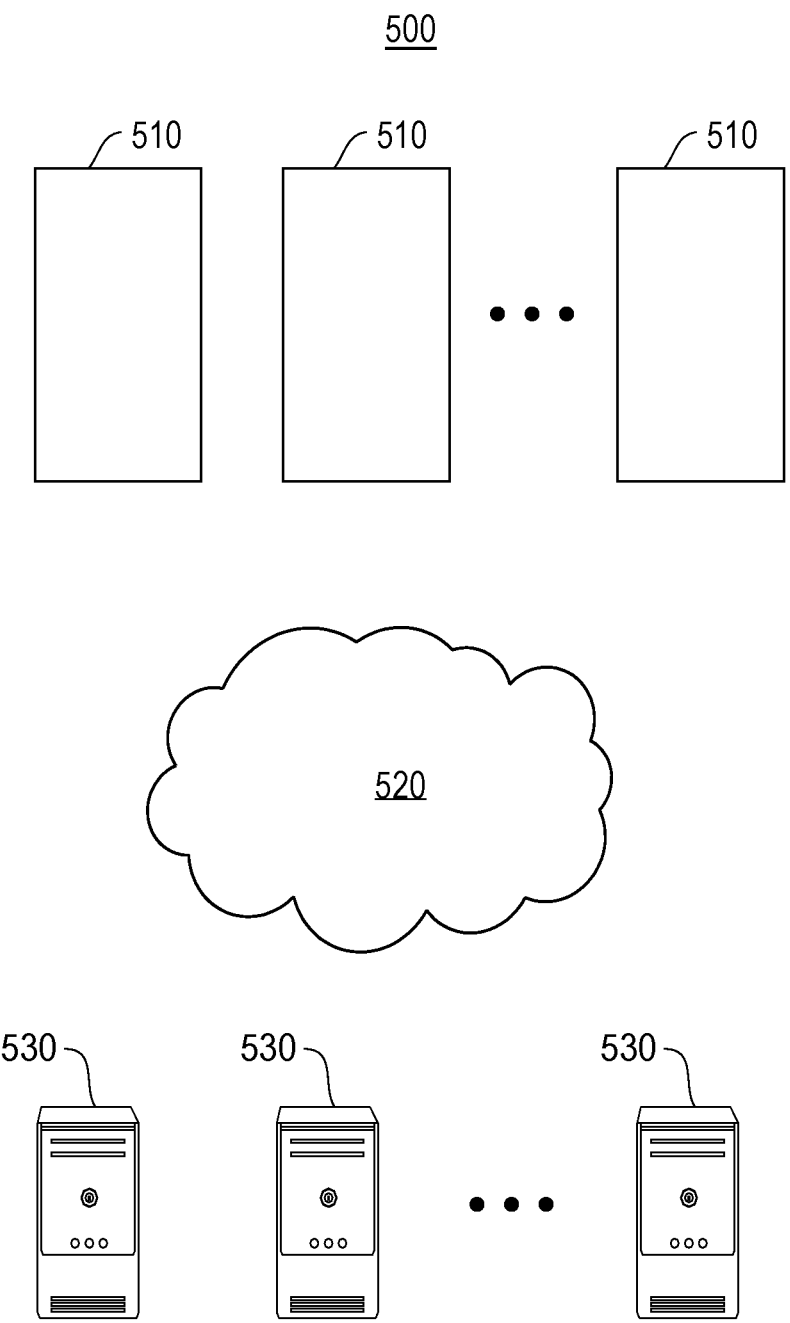
FIG. 5 is a block diagram illustrating a distributed system for AI certification of factsheets using blockchain processing, according to one embodiment.

FIG. 5 is a block diagram illustrating a distributed system 500 for blockchain certification of AI factsheets processing, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a data center, etc.), and servers 530. In one embodiment, the client devices 510 are provided with cloud services from the servers 530 through the cloud or resource sharing environment 520.

Conventional certification of AI factsheets include using a centralized entity that provides certificates. Some embodiments solve the necessity of deploying trust-able intermediaries. Blockchain systems implicitly elicit trust. This is in contrast to centralized certifying authorities employed in other technological areas where trust is not inherent. In decentralized systems, trust is built by multiple levels of third party intermediaries providing different levels of complexity.

Conventional AI pipelines have used blockchain support for varied purposes. However, these conventional systems do not address the problem of providing a mechanism for the sellers to have their factsheets attested. One embodiment solves the factsheet attestation problem using a blockchain based mechanism that provides certificates for the factsheet claims after verifying them. Using these certificates, sellers can advertise their assets and buyers can trustfully buy them. In one embodiment, a certificate of attestation is employed that validates factsheets claims made by the supplier using a blockchain as a certifying authority. The blockchain validates the claims in the factsheet by the suppliers and provides time bound contracts. The AI model/data suppliers can use this certificate to advertise their model/data to prospective buyers. The certificate enables buyers to make informed decisions about the model and therefore guarantee their purchases are true to their claims.

Figure 6:
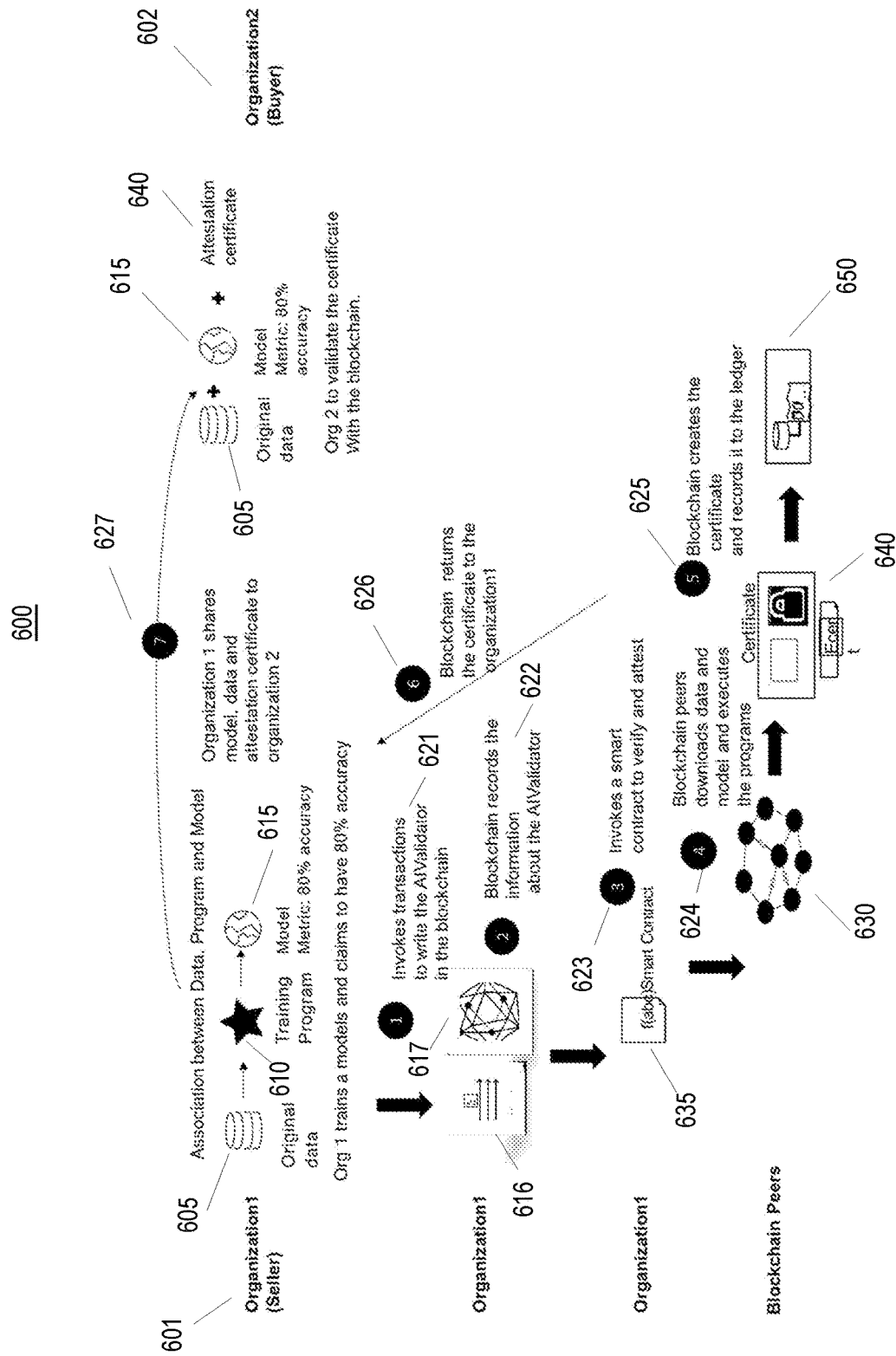
FIG. 6 is a block diagram illustrating a flow for certification of AI factsheets processing, according to one embodiment.

FIG. 6 is a block diagram illustrating a flow 600 for certification of AI factsheets processing, according to one embodiment. In one embodiment, the flow 600 is performed by a processor or processing system (e.g., a computing device from computing node 10, FIG. 1, hardware and software layer 60, FIG. 2, processing system 300, FIG. 3, system 400, FIG. 4, system 500, FIG. 5, etc.). In one embodiment, an organization 1 601 (e.g., a seller) has original data 605. The organization 1 601 trains at least one AI model using a training program 610 to model metrics 615 of, for example, a metric of 80% accuracy. At bullet 1 621, the organization 1 601 invokes transactions to write an AIValidator 616 (see, e.g., FIG. 7B) in the blockchain 617. The AIValidator 616 asset represents the AI pipeline validation program. At bullet 2 622, the flow 600 provides that the blockchain 617 records the information about the AIValidator 616. At bullet 3 623, the flow 600 invokes a smart contract 635 (see FIG. 8A, flow 800) to verify and attest the model metrics 615. In bullet 4 624, the blockchain peers 630 (peer nodes in the blockchain network) downloads the original data 605 and the AI model and executes the validation and verification programs. At bullet 5 625 the blockchain 617 creates the attestation certificate 640 (e.g., an electronic attestation certificate (Ecer)) and records or stores the attestation certificate 640 to a blockchain ledger 650. At bullet 6 626 the blockchain 617 returns (e.g., via an electronic communication, etc.) the attestation certificate 640 to organization 1 601. At bullet 7 627, the organization 1 601 shares the AI model, the original data 605, model metrics 615 and the attestation certificate 640 with organization 2 602.

In one embodiment, an AI marketplace may be a centralized AI marketplace or a distributed AI marketplace. For the centralized AI marketplace, all of the AI resources (see, e.g., AI resource (factsheet) 710, FIG. 7A) and users of them are available in a single development platform. In one embodiment, AI resources are available in a single logical store. For the distributed AI marketplace, the users and AI resources are not managed in a single store. Organizations can manage their own users and AI resources but can share their AI resources across organizations.

In one example embodiment, for a centralized marketplace using an attestation certificate 640, the process begins with an organization applying for the attestation certificate 640 to the blockchain 617. A supplier can request certification for either or all of the following: an AI training resource on model generation on specific datasets, an AI testing resource where the data is applied to a model and output is checked for performance metrics, and datasets along with its factsheet and AIValidator 616 for verifying the model metrics (e.g., model metric 615), where each of these are associated with the AI resource that needs to be validated. AI resources such as data, model, factsheet and validation programs should be provided as input to the validation interface. A blockchain 617 provides the following advantages in certification systems as compared to a centralized verification system. Firstly, a blockchain 617 facilitates participation of the organizations that share the assets directly in providing the certification, whereas a supplier organization in centralized verification systems has to rely on a third party central entity to provide the attestation certificates. One or more embodiments enhance the trust of the attestation certificates generated using a blockchain 617. Secondly, each participating entity (suppliers and requesting entity of AI resources) can set policies for issuing attestation certificates.

In one embodiment, the organization peers in the flow 600 provide computing and storage resources to support the certification process. It is in addition to the AI resources required for supporting the inherent blockchain operations, such as hash computations, storing of immutable records, etc. In one embodiment, the organization peers can be incentivized through separate incentive mechanisms to participate and contribute to computing and storage resources. In one embodiment, the incentives may be proportional to the amount of AI resources they contribute.

FIG. 7A is an example listing for an AI resource (factsheet) 710, according to one embodiment. The example listing of the AI resource (factsheet) 710 includes information such as user owner information, metadata, hash value, hash method and store reference. The AI resource (factsheet) 710 provides all information related to AI resources (e.g., information related to data and an AI model).

FIG. 7B is an example listing for an AIValidator 616, according to one embodiment. The AIValidator 616 contains the algorithm/function to validate the details with respect to the AI resources.

Figures 8A, 8B:
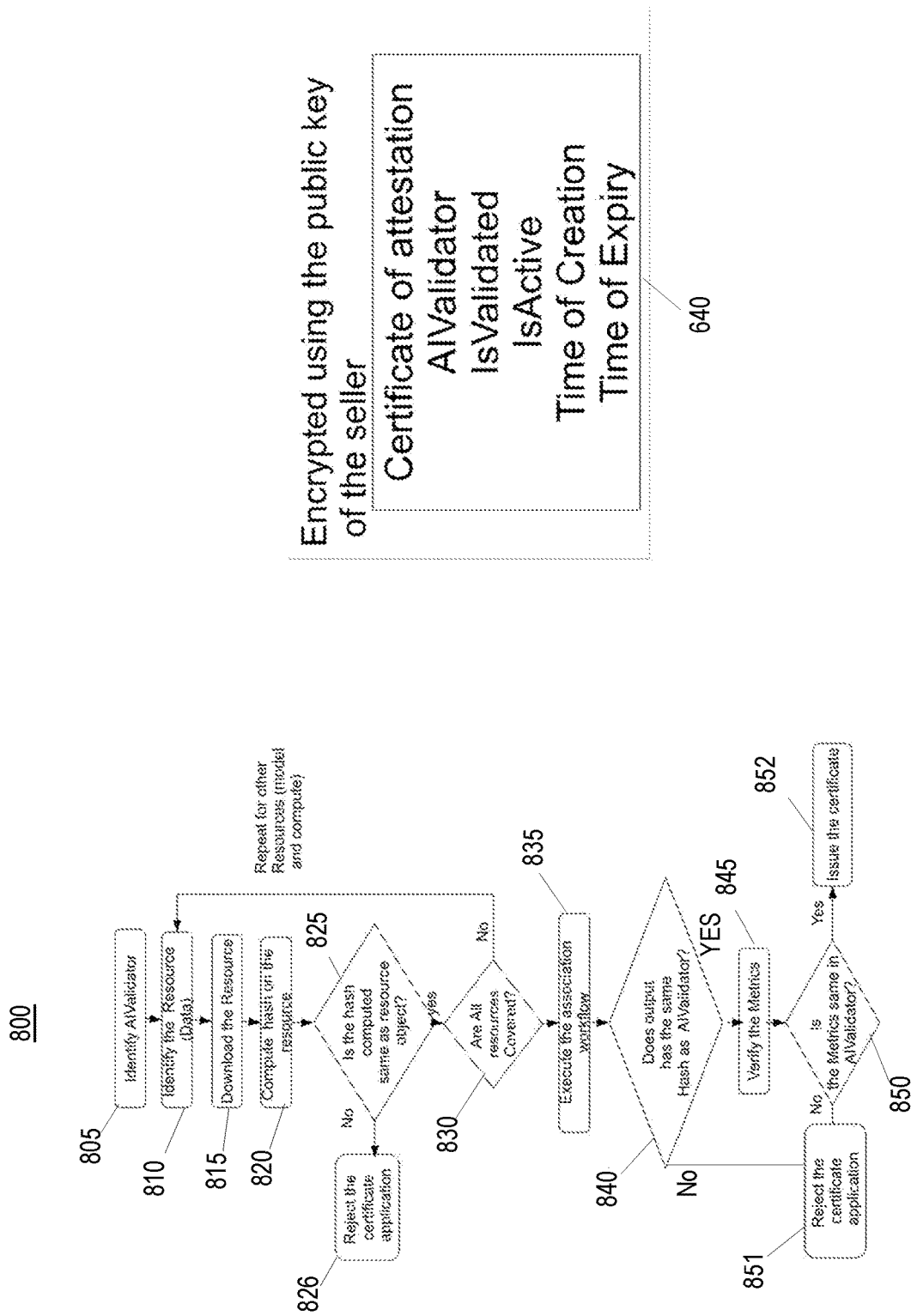
FIG. 8A is an example flow diagram for issuing a certificate using a smart contract, according to one embodiment.
FIG. 8B is an example issued certificate using a smart contract, according to one embodiment.

FIG. 8A is an example flow 800 diagram for issuing an attestation certificate (e.g., attestation certificate 640, FIG. 6) using a smart contract (e.g., smart contract 635, FIG. 6), according to one embodiment. In one embodiment, in block 805 flow 800 identifies an AIValidator (e.g., AIValidator 616, FIGS. 6 and 7B). The AI Validator is an input provided by the user along with the AI resources. In block 810 flow 800 identifies the AI resource (data) (e.g., AI resource 710, FIG. 7A) supplied by a user (AI resources data, metadata and AI model are supplied by the user). In block 815, flow 800 downloads the identified AI resource for processing. In block 820, flow 800 computes a hash (e.g., using a cryptographic function, etc.) on the AI resource. In block 825, the flow 800 determines is the hash is computed the same as a resource object (e.g., using conventional decryption techniques). If the result of block 825 is no (i.e., the hash is not computed the same as a resource object), flow 800 proceeds to block 826 where the certificate application is rejected. Otherwise, flow 800 proceeds to block 830 where it is determined if all resources are covered (or not). If it is determined that all resources are not covered in block 830, flow 800 proceeds to block 810. Otherwise, flow 800 proceeds to block 835 where the association workflow is executed (the association workflow includes the associated programs for validating the details of the AI resources.

In one embodiment, the flow 800 proceeds next to block 840 where it is determined whether the output (i.e., metrics details associated with different AI resources generated from the associated programs) from block 835 has a same hash as in the identified AIValidator. If the output from block 835 does not have the same hash as the AIValidator, flow 800 proceeds to block 851 where the certificate application is rejected (i.e., not issued). Otherwise, flow 800 proceeds to block 845 where the metrics (e.g., model metrics 615, FIG. 6) are verified (using the smart contract (e.g., smart contract 635, FIG. 6). In block 850, the flow 800 determines if the metrics for the model are the same as in the AIValidator. If it is determined that the metrics are the same as in the AIValidator, flow 800 proceeds to block 852 where the attestation certificate (e.g., attestation certificate 640, FIG. 6) is issued. Otherwise, flow 800 proceeds to block 851 where the certificate application is rejected (i.e., not issued).

FIG. 8B is an example issued attestation certificate 640 using a smart contract (e.g., smart contract 635, FIG. 6), according to one embodiment. In one embodiment, the attestation certificate 640 is encrypted using the public key of a seller. The attestation certificate 640 may include information, such as the AIValidator used, whether the attestation certificate 640 is validated or not, whether the attestation certificate 640 is active or not, the time of creation, time of expiration, etc.

Figure 9:
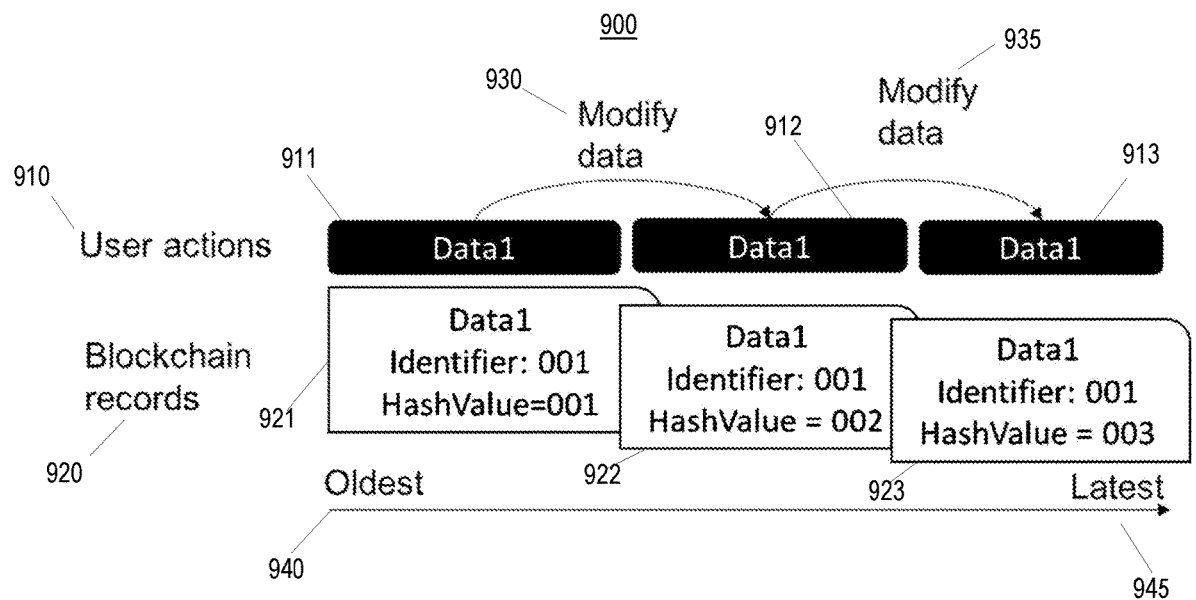
FIG. 9 is an example for tracking changes in a factsheet and an AIValidator using blockchain records, according to one embodiment.

FIG. 9 is an example flow diagram 900 for tracking changes in a factsheet (e.g., factsheet 710, FIG. 7A) and an AIValidator (e.g., AIValidator 616, FIGS. 6, 7B) using blockchain records 920, according to one embodiment. In the flow diagram 900, the initial information is for Data1 911 and blockchain record 921. The flow diagram 900 starts with the oldest 940 records to the latest 945 records. When a user action 910 modifies the Data1 911 at modify data 930, the result is Data1 912 and a blockchain record 922, which will have a modified or new hash value (HashValue=002). The blockchain record 922 is chained or added to the blockchain record 921. Then, when another user action 910 modifies the Data1 912 at modify data 935, the result is Data1 913 and a blockchain record 923, which will have a modified or new hash value (HashValue=003). The blockchain record 923 is chained or added to the prior blockchain record 922. This sequence continues as long as the data is modified/changed.

Figure 10:
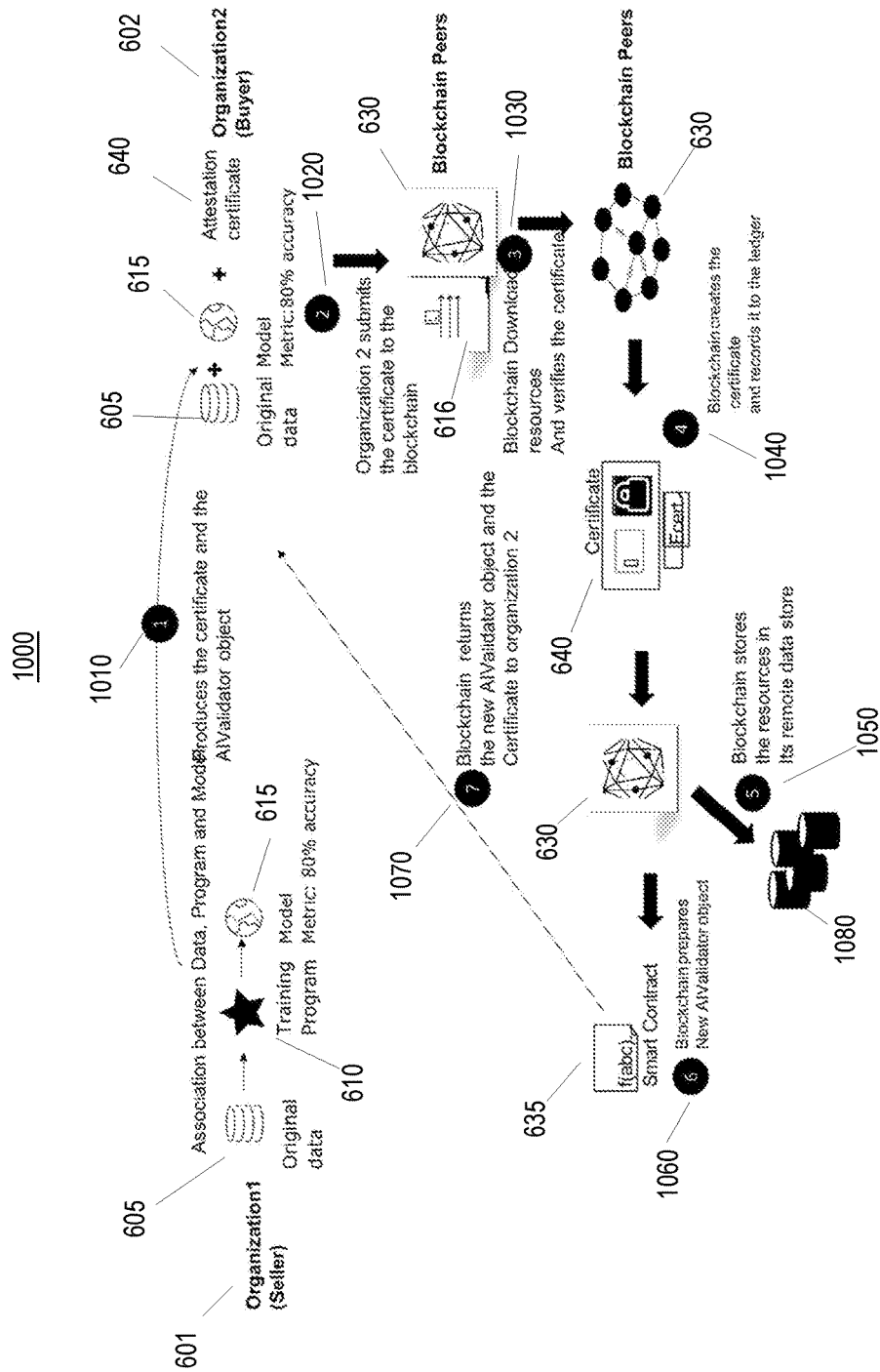
FIG. 10 is an example flow for using a blockchain as a moderator and certifying authority, according to one embodiment.

FIG. 10 is an example flow 1000 for using a blockchain as a moderator and certifying authority, according to one embodiment. Flow 1000 considers where different organizations have their own AI platform to develop models, but use an offline channel to share the AI resources and factsheets. In one embodiment, the AI platforms do not share a centralized repository for storing the AI resources and factsheets. For this decentralized AI platform scenario, two approaches for certifying the factsheets may be employed depending on whether the supplier is willing to use the blockchain as a repository of AI resources or otherwise. In the first approach (flow 1000), the blockchain is employed as a 'moderator' for any requests. In the second approach (flow 1100, FIG. 11), the blockchain peers 630 act as a repository of AI factsheets and provides a certified factsheet.

In one embodiment, the flow 1000 is performed by a processor or processing system (e.g., a computing device from computing node 10, FIG. 1, hardware and software layer 60, FIG. 2, processing system 300, FIG. 3, system 400, FIG. 4, system 500, FIG. 5, etc.). In one embodiment, an organization 1 601 (e.g., a seller) has original data 605. The organization 1 601 trains at least one AI model using a training program 610 to model metrics 615 of, for example, a metric of 80% accuracy. At bullet 1 1010, the organization 1 601 transfers the association between data, program and model produces the attestation certificate 640 and the AIValidator 616 to the organization 2 602. At bullet 2 1020, the flow 1000 provides that the organization 2 602 submits the attestation certificate 640 to the blockchain peers 630. At bullet 3 1030, the flow 1000 provides that the blockchain AI resources are downloaded and the attestation certificate 640 is verified using a verification program. At bullet 4 1040, the flow 1000 provides that the blockchain peers 630 create another attestation certificate 640 and records it in the blockchain ledger (e.g., blockchain ledger 650, FIG. 6). At bullet 5 1050, the flow 1000 provides that the blockchain peers 630 stores the AI resources in its remote data store 1080. At bullet 6 1060, the flow 1000 provides that the blockchain peers 630 prepares a new AIValidator object using the smart contract 635. At bullet 7 1070, the flow 1000 provides that the blockchain peers 630 returns the new AIValidator object and the new attestation certificate 640 to the organization 2 602.

Figure 11:
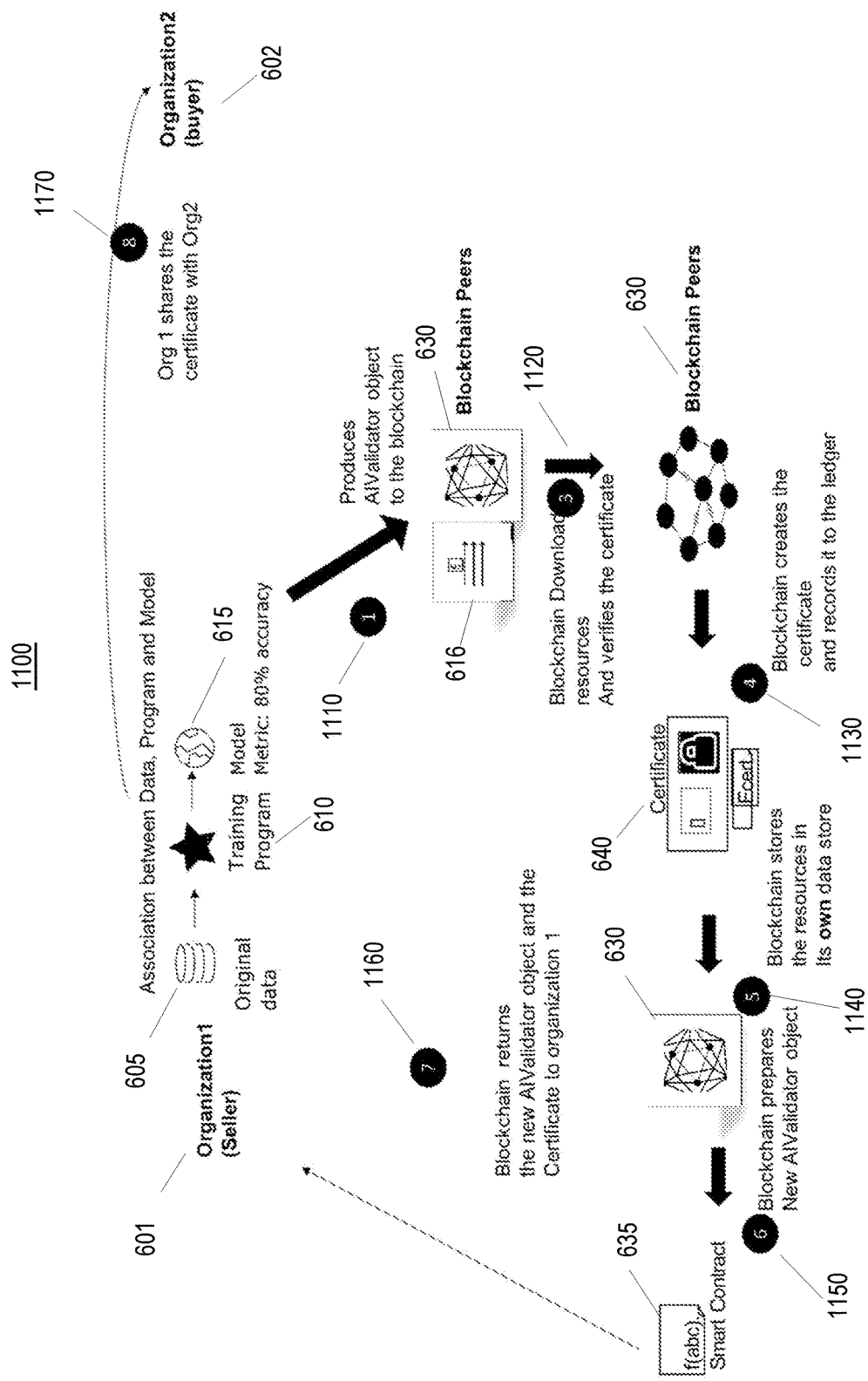
FIG. 11 is an example flow for using a blockchain for AI resources, for an AI factsheet repository and for certificates, according to one embodiment.

FIG. 11 is an example flow 1100 for using a blockchain (blockchain peers 630) for AI resources (e.g., factsheets, etc.) that is used for an AI factsheet repository and for certificates (e.g., attestation certificate 640), according to one embodiment. In flow 1100 the blockchain peers 630 act as a repository of AI factsheets and provides a certified factsheet. In one embodiment, the flow 1100 is performed by a processor or processing system (e.g., a computing device from computing node 10, FIG. 1, hardware and software layer 60, FIG. 2, processing system 300, FIG. 3, system 400, FIG. 4, system 500, FIG. 5, etc.). In one embodiment, an organization 1 601 (e.g., a seller) has original data 605. The organization 1 601 trains at least one AI model using a training program 610 to model metrics 615 of, for example, a metric of 80% accuracy. At bullet 1 1110, the organization 1 601 produces an AIValidator object for the blockchain peers 630 using the AIValidator 616. At bullet 3 1120, the flow 1100 provides that the blockchain AI resources are downloaded and the attestation certificate 640 is verified using a verification program. At bullet 4 1130, the flow 1100 provides that the blockchain peers 630 creates another attestation certificate 640 and records it in the blockchain ledger (e.g., blockchain ledger 650, FIG. 6). At bullet 5 1140, the flow 1100 provides that the blockchain peers 630 stores the AI resources in its own data store. At bullet 6 1150, the flow 1100 provides that the blockchain peers 630 prepares a new AIValidator object using the smart contract 635. At bullet 7 1160, the flow 1100 provides that the blockchain peers 630 returns the new AIValidator object and the new attestation certificate 640 to the organization 1 601. At bullet 8 1170, the flow 1100 provides that the organization 1 601 shares the new attestation certificate 640 with the organization 2 602.

Figure 12:
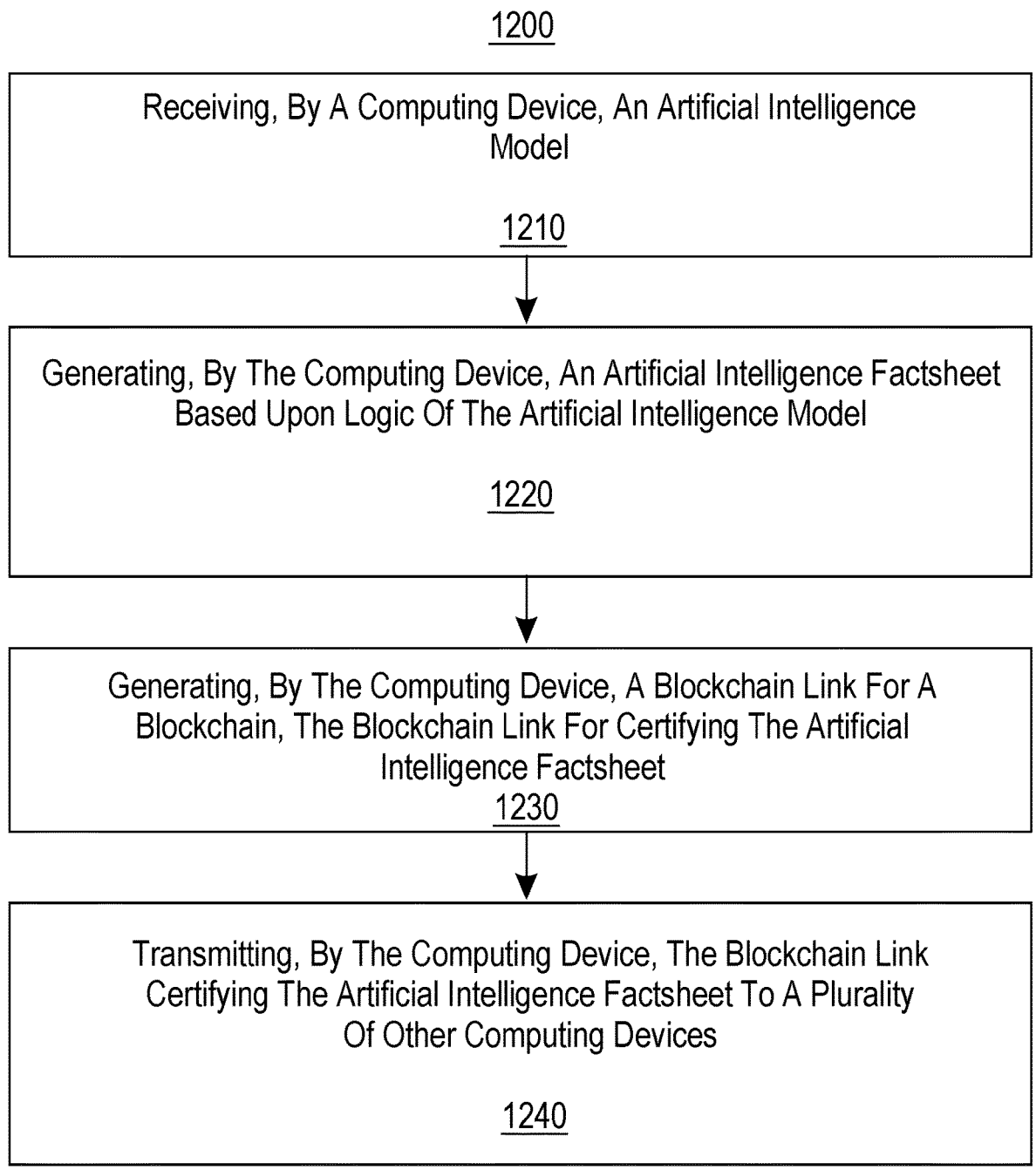
FIG. 12 illustrates a block diagram of a process for AI certification of factsheets using blockchain processing, according to one embodiment.

FIG. 12 illustrates a block diagram of a process 1200 for AI certification of factsheets using blockchain processing, according to one embodiment. In one embodiment, in block 1210 process 1200 utilizes a computing device (from computing node 10, FIG. 1, hardware and software layer 60, FIG. 2, processing system 300, FIG. 3, system 400, FIG. 4, system 500, FIG. 5, etc.) for receiving an AI model. In block 1220, process 1200 further provides for generating, by the computing device, an AI factsheet (e.g., AI factsheet 710) based upon logic of the AI model. In block 1230, process 1200 further provides for generating, by the computing device, a blockchain link for a blockchain (e.g., blockchain peers 630, FIGS. 6, 10 and 11) the blockchain link for certifying the AI factsheet. In block 1240, process 1200 further provides for transmitting, by the computing device, the blockchain link certifying the AI factsheet to multiple other computing devices.

In one embodiment, process 1200 may further include the feature that the blockchain link provides an attestation certificate (e.g., including an attestation certificate 640, FIGS. 6, 10 and 11) that certifies AI resources. The method may additionally include that the AI resources are selected from the group consisting of an AI training resource, an AI testing resource, and datasets with an associated factsheet and an AI validator (e.g., AIValidator 616, FIGS. 6, 7B, 10 and 11). The method may further include that the AI validator verifies metrics (e.g., metrics 615, FIGS. 6, 10 and 11) of the AI model. The method may still further include that the certificate of attestation is applied for within a centralized marketplace for AI resources or multiple distributed marketplaces for AI resources. The method may yet further include that the blockchain is employed as a moderator and certifying authority for AI resource requests for the centralized marketplace. The method may further include that the blockchain is employed for an AI repository for AI factsheets in each marketplace for the multiple distributed marketplaces.

In some embodiments, the features described above contribute to the advantage of overcoming the problem with uncertified factsheets, which can leave customers to deal with the risk of later finding data or AI models to be invalid or under-performing, or that of information asymmetry. Some embodiments provide the advantage of certification of AI factsheets so that a risk of finding data or AI models to be invalid or underperforming later on is mitigated. The features further contribute to the advantage obviating the necessity for a centralized entity that provide AI factsheet certification. Other advantages are that a blockchain can verify the claims of factsheets by executing a smart contract (e.g., smart contract 635, FIG. 6) that encapsulates the logic for ascertaining the AI factsheet claims. Using the attestation certificates (e.g., e.g., attestation certificate 640, FIGS. 6, 10 and 11), customers can trust the factsheet claims made by the suppliers and procure these assets with guarantees. Further advantages include a method by which sellers can publish their AI assets along with the AI factsheet and to verify the AI factsheet to the blockchain. Some embodiments provide the features of methods to incentivizes blockchain nodes to offer certificate services to AI marketplaces and associated AI factsheets. Attestation certificates issued by the blockchain are managed throughout their lifecycle.

One or more embodiments may be a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A method for blockchain certification of artificial intelligence factsheets, the method comprising:
   receiving, by a computing device, an artificial intelligence model;
   generating, by the computing device, an artificial intelligence factsheet based upon logic of the artificial intelligence model;
   generating, by the computing device, a blockchain link for a blockchain, the blockchain link for certifying the artificial intelligence factsheet; and
   transmitting, by the computing device, the blockchain link certifying the artificial intelligence factsheet to a plurality of other computing devices,
   wherein the blockchain link provides an attestation certificate that certifies artificial intelligence resources, and the artificial intelligence resource comprises datasets with an associated factsheet.

2. The method of claim 1, wherein the artificial intelligence resources are further selected from the group consisting of an artificial intelligence training resource, an artificial intelligence testing resource, artificial intelligence models, artificial intelligence preprocessing programs, and an artificial intelligence validator.

3. The method of claim 2, wherein the artificial intelligence validator verifies metrics of the artificial intelligence model.

4. The method of claim 1, wherein the certificate of attestation is applied for within a centralized marketplace for artificial intelligence resources or a plurality of distributed marketplaces for artificial intelligence resources.

5. The method of claim 4, wherein the blockchain is employed as a moderator and certifying authority for artificial intelligence resource requests for the centralized marketplace.

6. The method of claim 4, wherein the blockchain is employed for an artificial intelligence repository for artificial intelligence factsheets in each marketplace for the plurality of distributed marketplaces.

7. A computer program product for blockchain certification of artificial intelligence factsheets, the computer program product comprising a computer readable storage medium having program instructions embodied therewith, the program instructions executable by a processor to cause the processor to:
   receive, by the processor, an artificial intelligence model;
   generate, by the processor, an artificial intelligence factsheet based upon logic of the artificial intelligence model;
   generate, by the processor, a blockchain link for a blockchain, the blockchain link for certifying the artificial intelligence factsheet; and
   transmit, by the processor, the blockchain link certifying the artificial intelligence factsheet to a plurality of other computing devices,
   wherein the blockchain link provides an attestation certificate that certifies artificial intelligence resources, and the artificial intelligence resource comprises datasets with an associated factsheet.

8. The computer program product of claim 7, wherein the artificial intelligence resources are further selected from the group consisting of an artificial intelligence training resource, an artificial intelligence testing resource, artificial intelligence models, artificial intelligence preprocessing programs, and an artificial intelligence validator.

9. The computer program product of claim 8, wherein the artificial intelligence validator verifies metrics of the artificial intelligence model.

10. The computer program product of claim 7, wherein the certificate of attestation is applied for within a centralized marketplace for artificial intelligence resources or a plurality of distributed marketplaces for artificial intelligence resources.

11. The computer program product of claim 10, wherein the blockchain is employed as a moderator and certifying authority for artificial intelligence resource requests for the centralized marketplace.

12. The computer program product of claim 10, wherein the blockchain is employed for an artificial intelligence repository for artificial intelligence factsheets in each marketplace for the plurality of distributed marketplaces.

13. An apparatus comprising:
    a memory configured to store instructions; and
    a processor configured to execute the instructions to:
       receive an artificial intelligence model;
       generate an artificial intelligence factsheet based upon logic of the artificial intelligence model;
       generate a blockchain link for a blockchain, the blockchain link for certifying the artificial intelligence factsheet; and
       transmit the blockchain link certifying the artificial intelligence factsheet to a plurality of other computing devices,
    wherein the blockchain link provides an attestation certificate that certifies artificial intelligence resources, and the artificial intelligence resource comprises datasets with an associated factsheet.

14. The apparatus of claim 13, wherein the artificial intelligence resources are selected from the group consisting of an artificial intelligence training resource, an artificial intelligence testing resource, artificial intelligence models, artificial intelligence preprocessing programs, and artificial intelligence validator.

15. The apparatus of claim 14, wherein the artificial intelligence validator verifies metrics of the artificial intelligence model, and the certificate of attestation is applied for within a centralized marketplace for artificial intelligence resources or a plurality of distributed marketplaces for artificial intelligence resources.

16. The apparatus of claim 15, wherein the blockchain is employed as a moderator and certifying authority for artificial intelligence resource requests for the centralized marketplace.

17. The apparatus of claim 15, wherein the blockchain is employed for an artificial intelligence repository for artificial intelligence factsheets in each marketplace for the plurality of distributed marketplaces.

* * * * *